US011322760B2

(12) United States Patent
Toida et al.

(10) Patent No.: US 11,322,760 B2
(45) Date of Patent: May 3, 2022

(54) FUEL CELL SYSTEM AND METHOD FOR CONTROLLING FUEL CELL SYSTEM

(71) Applicant: TOYOTA JIDOSHA KABUSHIKI KAISHA, Toyota (JP)

(72) Inventors: Masashi Toida, Nagoya (JP); Tsuyoshi Maruo, Okazaki (JP); Hiroyuki Tsunekawa, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/884,250

(22) Filed: May 27, 2020

(65) Prior Publication Data
US 2021/0013529 A1  Jan. 14, 2021

(30) Foreign Application Priority Data
Jul. 8, 2019 (JP) .............................. JP2019-126718

(51) Int. Cl.
| H01M 8/04 | (2016.01) |
| H01M 8/04303 | (2016.01) |
| H01M 8/04119 | (2016.01) |
| H01M 8/0438 | (2016.01) |
| H01M 8/04223 | (2016.01) |
| H01M 8/04746 | (2016.01) |
| H01M 8/04228 | (2016.01) |

(52) U.S. Cl.
CPC ... *H01M 8/04303* (2016.02); *H01M 8/04164* (2013.01); *H01M 8/04179* (2013.01); *H01M 8/04228* (2016.02); *H01M 8/04231* (2013.01); *H01M 8/04402* (2013.01); *H01M 8/04753* (2013.01); *H01M 8/04761* (2013.01)

(58) Field of Classification Search
CPC ......... H01M 8/04164; H01M 8/04179; H01M 8/04228; H01M 8/04231; H01M 8/04303; H01M 8/04402; H01M 8/04753; H01M 8/04761; H01M 8/04835; H01M 8/04843; Y02E 60/50
See application file for complete search history.

(56) References Cited

U.S. PATENT DOCUMENTS

| 2007/0092771 A1* | 4/2007 | Wake ................ H01M 8/04225 429/414 |
| 2010/0055523 A1* | 3/2010 | Ogawa .............. H01M 8/04164 429/426 |

FOREIGN PATENT DOCUMENTS

| JP | 2009104966 A | 5/2009 |
| JP | 2009224179 A | 10/2009 |

* cited by examiner

*Primary Examiner* — Brittany L Raymond
(74) *Attorney, Agent, or Firm* — Dickinson Wright, PLLC

(57) ABSTRACT

A fuel cell system comprises: a gas-liquid separator separating exhaust gas of a fuel cell stack into a liquid component and a gas component and storing liquid water of the liquid component; a circulation pipe; a drain pipe discharging the liquid water; and a drain valve opening and closing the drain pipe. In an end scavenging process that is executed when operation of the fuel cell system is finished, the control unit opens the drain valve when a valve opening condition for the drain valve is satisfied. The valve opening condition is set such that an amount of the liquid water stored in the gas-liquid separator at the time the drain valve is opened in the end scavenging process is larger than an amount of the liquid water stored in the gas-liquid separator at the time the drain valve is opened during normal operation of the fuel cell system.

5 Claims, 7 Drawing Sheets

FUEL CELL SYSTEM AND METHOD FOR CONTROLLING FUEL CELL SYSTEM

INCORPORATION BY REFERENCE

The disclosure of Japanese Patent Application No. 2019-126718 filed on Jul. 8, 2019 including the specification, drawings and abstract is incorporated herein by reference in its entirety.

BACKGROUND

1. Technical Field

The disclosure relates to fuel cell systems and methods for controlling a fuel cell system.

2. Description of Related Art

For example, Japanese Unexamined Patent Application Publication No. 2009-104966 discloses a fuel cell system that separates exhaust gas discharged from a fuel cell stack into a gas component and a liquid component by a gas-liquid separator, circulates the gas component to the fuel cell stack, and stores the liquid component as liquid water in the gas-liquid separator and then discharges the liquid water from the gas-liquid separator.

SUMMARY

In such a fuel cell system in which exhaust gas is circulated to and reused by a fuel cell stack using a gas-liquid separator as described above, water droplets formed on the inner wall surface of the gas-liquid separator may remain thereon even after operation of the fuel cell system is finished. When the operation of the fuel cell system is finished with such water droplets remaining in the gas-liquid separator, these water droplets may either freeze in the gas-liquid separator or move to a drain valve provided in a drain path from the gas-liquid separator and freeze in the drain valve in a low temperature environment such as below the freezing point. The water droplets frozen in the gas-liquid separator make it difficult to know the amount of liquid water stored in the gas-liquid separator. Moreover, the frozen drain valve hinders discharge of the liquid water from the gas-liquid separator. Conventionally, such water droplets remaining on the inner wall surface of the gas-liquid separator cannot be sufficiently reduced even by performing a scavenging process when the operation of the fuel cell system is finished.

The technology of the present disclosure can be implemented in the following forms.

A first form is provided as a fuel cell system. The fuel cell system of this form includes: a fuel cell stack configured to be supplied with reactant gas to generate electric power; a gas-liquid separator connected to the fuel cell stack and configured to separate exhaust gas of the fuel cell stack into a liquid component and a gas component and to store liquid water of the liquid component; a circulation pipe that is connected to the gas-liquid separator and that constitutes a circulation path configured to circulate the gas component in the gas-liquid separator to the fuel cell stack; a drain pipe connected to the gas-liquid separator and configured to discharge the liquid water from the gas-liquid separator; a drain valve configured to open and close the drain pipe; and a control unit configured to control the supply of the reactant gas to the fuel cell stack and to execute an end scavenging process, the end scavenging process being a process of circulating as scavenging gas the gas component of the exhaust gas to perform scavenging when operation of the fuel cell system is finished. The control unit is configured to perform drain valve control, the drain valve control being control in which, when a valve opening condition determined in advance in association with an amount of the liquid water stored in the gas-liquid separator is satisfied, the drain valve is opened to discharge the liquid water from the gas-liquid separator. The control unit is configured such that, in the end scavenging process, the control unit performs the drain valve control using the valve opening condition that is set such that an amount of the liquid water stored in the gas-liquid separator at the time the drain valve is opened in the end scavenging process is larger than an amount of the liquid water stored in the gas-liquid separator at the time the drain valve is opened during normal operation of the fuel cell system. According to the fuel cell system of this form, in the end scavenging process, the level of the liquid water in the gas-liquid separator at the time the drain valve is opened is higher, and therefore the area of the region where water droplets formed on an inner wall surface of the gas-liquid separator remain thereon is reduced. This configuration thus reduces the amount of water droplets remaining on the inner wall surface of the gas-liquid separator when the operation of the fuel cell system is finished. Accordingly, a failure due to freezing of moisture remaining in the gas-liquid separator is less likely to occur when the fuel cell system is restarted in a low temperature environment.

In the fuel cell system of the above form, the control unit may be configured to obtain the amount of the liquid water stored in the gas-liquid separator. The control unit may be configured such that, in the drain valve control that is performed during the normal operation of the fuel cell system, the control unit determines that the valve opening condition is satisfied and opens the drain valve when the amount of the liquid water stored in the gas-liquid separator becomes larger than a predetermined first threshold. The control unit may be configured such that, in the drain valve control that is performed in the end scavenging process, the control unit determines that the valve opening condition is satisfied and opens the drain valve when the amount of the liquid water stored in the gas-liquid separator becomes larger than a second threshold that is set to a larger value than the first threshold. According to the fuel cell system of this form, the liquid water can be discharged at an appropriate timing in accordance with the amount of the liquid water stored in the gas-liquid separator, based on the determination of the amount of the liquid water stored in the gas-liquid separator.

In the fuel cell system of the above form, the control unit may be configured such that, in the end scavenging process, the control unit determines a flow rate of the scavenging gas and sets the valve opening condition according to the determined flow rate of the scavenging gas before starting the scavenging. According to the fuel cell system of this form, as the valve opening condition is set, the level of the liquid water in the gas-liquid separator at the time the drain valve is opened can be changed according to the flow rate of the scavenging gas during the end scavenging process. Accordingly, even when the flow rate of the scavenging gas is changed, the liquid water is less likely to be stirred up from the gas-liquid separator due to suction of a pump.

In the fuel cell system of the above form, a filter configured such that the liquid water passes through the filter may be provided in the gas-liquid separator. The filter may be disposed so as to divide an internal space of the gas-liquid separator into a first region above the filter and a second region below the filter. The control unit may be configured such that, during the normal operation of the fuel cell system, the control unit performs the drain valve control using a first valve opening condition as the valve opening condition, the first valve opening condition being determined such that the drain valve is opened when the level of the liquid water in the gas-liquid separator is in the second region. The control unit may be configured such that, in the end scavenging process, the control unit performs the drain valve control using a second valve opening condition as the valve opening condition, the second valve opening condition being determined such that the drain valve is opened when the level of the liquid water in the gas-liquid separator is in the first region. According to the fuel cell system of this form, since the filter is provided, foreign matter contained in the liquid water is less likely to reach the drain valve, and therefore a failure of the drain valve due to the foreign matter is less likely to occur. Moreover, moisture is less likely to remain on the filter after discharge of the liquid water from the gas-liquid separator is completed in the end scavenging process. Clogging of the filter due to freezing of moisture remaining thereon is less likely to occur when the fuel cell system is restarted in a low temperature environment.

Another form is provided as a method for controlling a fuel cell system. The fuel cell system includes a fuel cell stack configured to be supplied with reactant gas to generate electric power, a gas-liquid separator configured to separate exhaust gas of the fuel cell stack into a liquid component and a gas component and to store liquid water of the liquid component therein, a circulation pipe that constitutes a circulation path configured to circulate the gas component in the gas-liquid separator to the fuel cell stack, a drain pipe configured to discharge the liquid water from the gas-liquid separator, and a drain valve configured to open and close the drain pipe. The method for controlling the fuel cell system according to this form includes: executing an end scavenging process, the end scavenging process being a process of circulating as scavenging gas the gas component of the exhaust gas to perform scavenging when operation of the fuel cell system is finished; and performing drain valve control, the drain valve control being control in which, when a valve opening condition determined in advance in association with an amount of the liquid water stored in the gas-liquid separator is satisfied, the drain valve is opened to discharge the liquid water from the gas-liquid separator. In the end scavenging process, the drain valve control is performed using the valve opening condition that is set such that an amount of the liquid water stored in the gas-liquid separator at the time the drain valve is opened in the end scavenging process is larger than an amount of the liquid water stored in the gas-liquid separator at the time the drain valve is opened during normal operation of the fuel cell system.

The technique of the present disclosure can be implemented in various forms other than the fuel cell system. For example, the technique of the present disclosure can be implemented in forms such as a vehicle equipped with a fuel cell system, a method for controlling a fuel cell vehicle, a method for performing drainage in a fuel cell system or a fuel cell vehicle, a method for performing scavenging or a method for performing drainage in a fuel cell system or a fuel cell vehicle, a control device or a computer program which implements these methods, and a non-transitory storage medium having the computer program recorded thereon.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. First Embodiment

Figure 1:
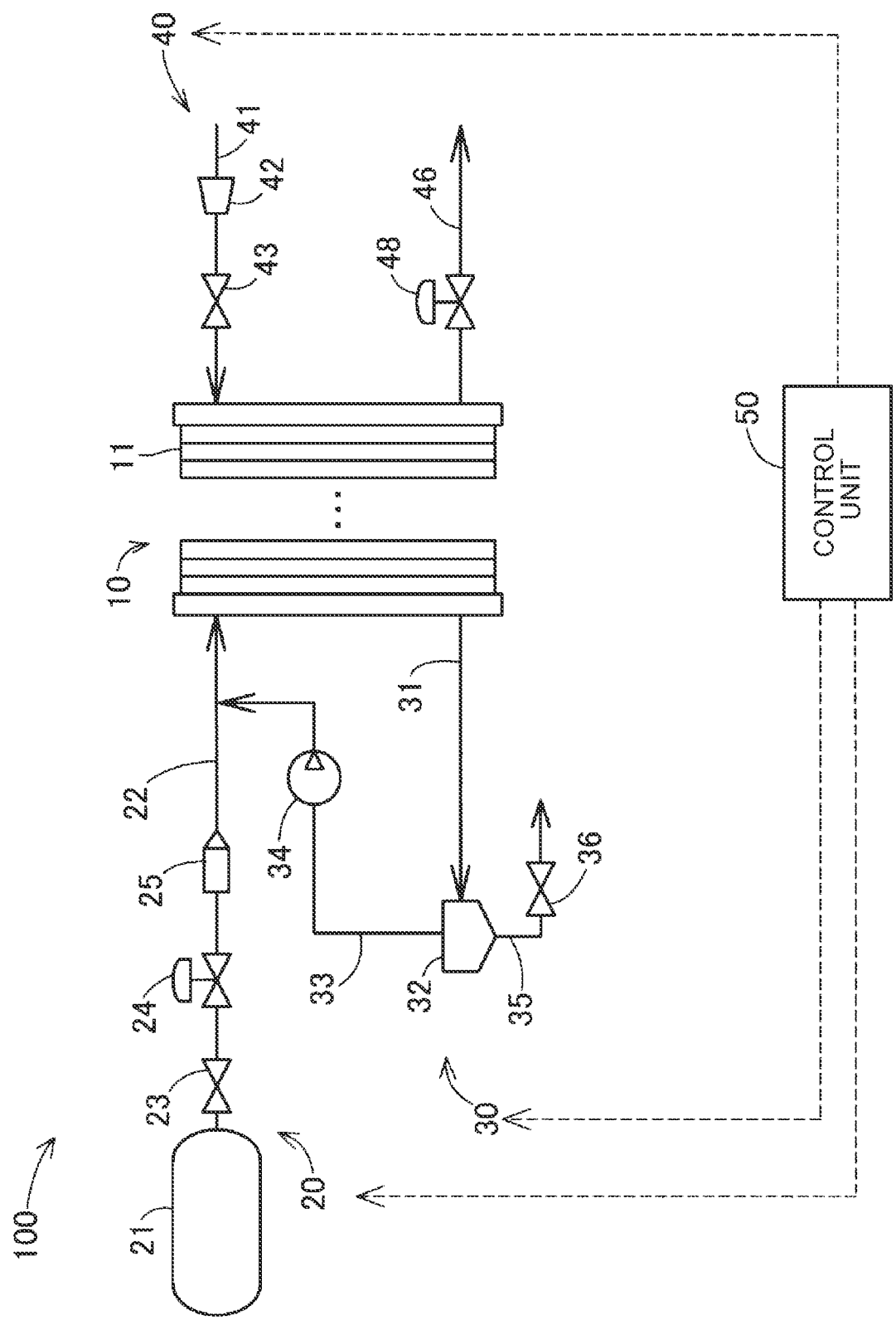
FIG. 1 is a schematic diagram illustrating a configuration of a fuel cell system.

FIG. 1 is a schematic diagram illustrating a configuration of a fuel cell system 100 according to a first embodiment. The fuel cell system 100 is mounted on, e.g., a vehicle and supplies electric power to a drive motor that generates a driving force and auxiliary devices used in the vehicle. In other embodiments, the fuel cell system 100 may be mounted on moving bodies other than vehicles, such as a ship, or may be stationary as power generation equipment for buildings etc.

The fuel cell system 100 includes a fuel cell stack 10 that is supplied with reactant gas, namely fuel gas and oxidant gas, to generate electric power. The fuel cell stack 10 is, e.g., a solid-state polymer electrolyte fuel cell stack and generates electric power by an electrochemical reaction between hydrogen as fuel gas and oxygen as oxidant gas. The fuel cell stack 10 has a stacked structure in which a plurality of single cells 11 are stacked. Each single cell 11 is a power generating element capable of generating electric power even by itself and has a membrane electrode assembly and two separators sandwiching the membrane electrode assembly therebetween. The membrane electrode assembly is a power generator composed of an electrolyte membrane and electrodes disposed on both sides of the electrolyte membrane. The electrolyte membrane is a thin solid polymer membrane that exhibits satisfactory proton conductivity when in a wet state, namely when containing moisture.

The fuel cell system 100 further includes a gas supply unit 20, a gas circulation unit 30, a gas supply/discharge unit 40 as constituent units for supplying reactant gas to the fuel cell stack 10 and discharging exhaust gas from the fuel cell stack 10. The gas supply unit 20 and the gas circulation unit 30 control fuel gas that is supplied to an anode of the fuel cell stack 10, and the gas supply/discharge unit 40 controls oxidant gas that is supplied to a cathode of the fuel cell stack 10.

The gas supply unit 20 supplies fuel gas to the anode of the fuel cell stack 10. The gas supply unit 20 includes a tank 21, a fuel gas pipe 22, a main stop valve 23, a regulator 24, and a supply device 25. The tank 21 stores high-pressure fuel gas therein. The fuel gas pipe 22 connects the tank 21 and an anode inlet of the fuel cell stack 10. The main stop valve 23, the regulator 24, and the supply device 25 are disposed in the fuel gas pipe 22 in this order from the upstream side, namely from the tank 21 side. The main stop valve 23 is an electromagnetic valve. The main stop valve 23 is controlled by a control unit 50 to open and close the fuel gas pipe 22 to control outflow of the fuel gas from the tank 21. The regulator 24 is a pressure reducing valve and adjusts the pressure in the fuel gas pipe 22 on the upstream side of the supply device 25. The supply device 25 is periodically driven to open and close to feed the fuel gas to the fuel cell stack 10. The supply device 25 is, e.g., an injector that is an electromagnetic on-off valve that is driven to open and close at set intervals. The intervals at which the supply device 25 is driven are controlled by the control unit 50.

The gas circulation unit 30 has a function to circulate fuel gas contained in exhaust gas discharged from the anode of the fuel cell stack 10 to the fuel cell stack 10 and a function to discharge inert gas and exhaust water which are contained in the exhaust gas to the outside of the fuel cell system 100. The gas circulation unit 30 includes an exhaust gas pipe 31, a gas-liquid separator 32, a circulation pipe 33, a pump 34, a drain pipe 35, and a drain valve 36.

The exhaust gas pipe 31 is connected to an anode outlet of the fuel cell stack 10 and the gas-liquid separator 32. The exhaust gas pipe 31 guides exhaust gas on the anode side, which contains a gas component such as fuel gas that has not been used for power generation at the anode and inert gas, and a liquid component such as water vapor and liquid water, into the gas-liquid separator 32. As used herein, the "liquid component" of the exhaust gas is a concept that is not limited to the liquid component in the form of liquid water but includes a component in a gas state such as water vapor which changes to liquid water by a change of state. This is because water vapor in the exhaust gas is partially condensed into liquid water in the gas-liquid separator 32. Other embodiments may use a configuration in which the exhaust gas pipe 31 is omitted and the gas-liquid separator 32 is directly connected to the anode outlet of the fuel cell stack 10.

The gas-liquid separator 32 separates the liquid component and the gas component which are contained in the exhaust gas flowing through the exhaust gas pipe 31 into the gas-liquid separator 32 from each other and stores the liquid component as liquid water therein. The liquid component of the exhaust gas includes both moisture in a gas state and moisture in the form of liquid water. The liquid water stored in the gas-liquid separator 32 includes liquid water condensed from the moisture in a gas state in the gas-liquid separator 32 and the liquid water flowing into the gas-liquid separator 32. The configuration of the gas-liquid separator 32 and the mechanism of gas-liquid separation of the exhaust gas in the gas-liquid separator 32 will be described later.

The circulation pipe 33 is connected to the gas-liquid separator 32 and forms a circulation path for circulating the gas component separated by the gas-liquid separator 32 to the anode of the fuel cell stack 10. In the present embodiment, the circulation pipe 33 connects the gas-liquid separator 32 and a part of the fuel gas pipe 22 which is located downstream of the supply device 25. The pump 34 is provided in the circulation pipe 33. The pump 34 is controlled by the control unit 50 to generate a pressure that feeds the gas component in the gas-liquid separator 32 to the fuel cell stack 10.

The drain pipe 35 is connected to the gas-liquid separator 32 and guides and discharges the liquid water stored in the gas-liquid separator 32 and the inert gas contained in the exhaust gas to the outside of the gas-liquid separator 32. The drain valve 36 is provided in the drain pipe 35. The drain valve 36 is controlled by the control unit 50 to open and close the drain pipe 35. In the fuel cell system 100, liquid water is stored in the gas-liquid separator 32 while the drain valve 36 is closed, and the liquid water stored in the gas-liquid separator 32 is discharged as exhaust water through the drain pipe 35 to the outside of the fuel cell system 100 when the drain valve 36 is opened. The downstream end of the drain pipe 35 may be connected to a discharge pipe 46 of the gas supply/discharge unit 40.

The gas supply/discharge unit 40 has a function to supply oxidant gas to the cathode of the fuel cell stack 10 and a function to discharge exhaust gas, which is discharged from the cathode of the fuel cell stack 10, to the outside of the fuel cell system 100. In the first embodiment, oxygen contained in outside air is supplied as oxidant gas to the fuel cell stack 10. The gas supply/discharge unit 40 includes a supply pipe 41, a compressor 42, an on-off valve 43, the discharge pipe 46, and a pressure regulating valve 48.

The supply pipe 41 has its one end communicating with outside air and the other end connected to a cathode inlet of the fuel cell stack 10. The compressor 42 compresses the outside air introduced from the one end of the supply pipe 41 and feeds the compressed air toward the on-off valve 43 provided in the supply pipe 41 at a position closer to the other end of the supply pipe 41. The on-off valve 43 is normally closed and is opened by the pressure of the compressed gas fed from the compressor 42 to allow the compressed gas to flow into the cathode of the fuel cell stack 10.

The discharge pipe 46 is connected to a cathode outlet of the fuel cell stack 10 and guides the exhaust gas discharged from the cathode of the fuel cell stack 10 to the outside of the fuel cell system 100. The pressure regulating valve 48 is provided in the discharge pipe 46 and adjusts a back pressure on the cathode side of the fuel cell stack 10.

The fuel cell system 100 further includes the control unit 50 that controls operation of the fuel cell system 100. The control unit 50 is an electronic control unit (ECU) including at least one processor and a main storage device. The control unit 50 executes programs and instructions read into the main storage device by the processor and thus performs various functions to control the operation of the fuel cell system 100. At least a part of the functions of the control unit 50 may be provided by a hardware circuit.

The control unit 50 controls power generation of the fuel cell stack 10. The control unit 50 controls the gas supply unit 20, the gas circulation unit 30, and the gas supply/discharge unit 40 to control supply of reactant gas to the fuel cell stack 10 and discharge of exhaust gas from the fuel cell system 100. The control unit 50 controls the intervals at which the supply device 25 is driven and the rotational speed of the pump 34 to control the amount and pressure of fuel gas to be supplied to the fuel cell stack 10. The control unit 50 controls the rotational speed of the compressor 42 to control the amount of oxidant gas to be supplied to the fuel cell stack 10, and controls the opening of the pressure regulating valve 48 to adjust the pressure on the cathode side of the fuel cell stack 10.

While the fuel cell system 100 is being driven, the control unit 50 controls opening and closing of the drain valve 36 in the gas circulation unit 30 to perform drain valve control. The drain valve control is control in which the drain valve 36 is normally kept closed, and when a predetermined valve opening condition is satisfied, the drain valve 36 is opened to discharge liquid water from the gas-liquid separator 32. The valve opening condition is a condition determined in relation to the amount of liquid water stored in the gas-liquid separator 32. In the first embodiment, the valve opening condition for the drain valve 36 is satisfied when the amount of liquid water stored in the gas-liquid separator 32 becomes larger than a predetermined threshold. In the first embodiment, the control unit 50 calculates an estimated amount of liquid water stored in the gas-liquid separator 32 and determines whether the valve opening condition is satisfied or not using the estimated value. The amount of liquid water stored in the gas-liquid separator 32 can be estimated using a known function expression and a known map and using parameters such as the amount of power generated by the fuel cell stack 10, the water content of the fuel cell stack 10, the water temperature, and the partial pressure of water vapor in reactant gas.

The control unit 50 performs the drain valve control during normal operation of the fuel cell system 100 or during an end scavenging process described later. As used herein, "normal operation of the fuel cell system 100" means operation in which reactant gas is supplied from the gas supply unit 20, the gas circulation unit 30, and the gas supply/discharge unit 40 to the fuel cell stack 10 to cause the fuel cell stack 10 to generate a target amount of power. The period of the normal operation of the fuel cell system 100 includes a period during which the fuel cell stack 10 stops generating the target amount of power in order for a predetermined temporary process to be executed without stopping the fuel cell system 100, such as a period of a warm-up operation or a period of a scavenging process described later. During the normal operation of the fuel cell system 100, the control unit 50 opens the drain valve 36 by the drain valve control and then closes the drain valve 36 at the time discharge of liquid water from the gas-liquid separator 32 and discharge of a predetermined amount of inert gas from the gas-liquid separator 32 are considered to be completed. The timing at which the drain valve 36 is closed may be determined based on, e.g., the amount of liquid water stored in the gas-liquid separator 32 at the time the drain valve 36 is opened.

The control unit 50 executes a scavenging process when a predetermined execution condition is satisfied during the normal operation of the fuel cell system 100. The scavenging process is a process of scavenging the fuel cell system 100. For example, the control unit 50 executes the scavenging process when an estimated water content of the fuel cell stack 10 becomes larger than a predetermined threshold, when blockage of a gas flow path by produced water is detected, when a scavenging command is detected which is given by the user by performing a switch operation, etc.

In the scavenging process, the control unit 50 stops driving the supply device 25 and drives the pump 34 to circulate between the gas circulation unit 30 and the fuel cell stack 10 the gas component of the exhaust gas separated by the gas-liquid separator 32. In the scavenging process, this gas component is used as scavenging gas. The flow path for fuel gas including the flow path in the fuel cell stack 10 is scavenged by this circulation of the gas component of the exhaust gas. In the scavenging process, the control unit 50 may drive the compressor 42 to scavenge the flow path for oxidant gas including the flow path in the fuel cell stack 10 using outside air, in addition to scavenging the gas flow path on the anode side of the fuel cell stack 10.

The control unit 50 also performs the drain valve control during the scavenging process. Accordingly, when the valve opening condition is satisfied, liquid water guided to and stored in the gas-liquid separator 32 is discharged from the gas-liquid separator 32 by the scavenging gas. In the drain valve control that is performed during the scavenging process as well, the control unit 50 determines whether the drain valve 36 should be opened or not using the estimated amount of liquid water stored in the gas-liquid separator 32 calculated by a method similar to that described above. The amount of power generated by the fuel cell stack 10 using the reactant gas component contained in the scavenging gas is used to calculate the estimated amount of liquid water stored in the gas-liquid separator 32 in the scavenging process.

In the fuel cell system 100, the control unit 50 executes the end scavenging process when the operation of the fuel cell system 100 is finished, in addition to the scavenging process that is executed during the normal operation of the fuel cell system 100. The expression "when the operation of the fuel cell system 100 is finished" means when preparation to finish the operation of the fuel cell system 100 is started in response to a command from the user or the control unit 50 and means the stage before the operation of the fuel cell system 100 is completely finished. The expression "when the operation of the fuel cell system 100 is finished" includes, e.g., when the control unit 50 finishes the operation of the fuel cell system 100 again after automatically starting the fuel cell system 100 according to a program during a suspension period after the operation of the fuel cell system 100 is finished.

In the end scavenging process, the flow path for fuel gas is scavenged in a manner similar to that in the scavenging process that is executed during the normal operation of the fuel cell stack 10 as described above. Namely, the pump 34 is driven to circulate as scavenging gas the gas component of the exhaust gas, thereby scavenging the flow path for fuel gas. In the end scavenging process as well, the compressor 42 may be driven to scavenge the flow path for oxidant gas. The drain valve control described above is also performed in the end scavenging process. In the drain valve control that is performed in the end scavenging process, a valve opening condition different from the valve opening condition that is used during the normal operation of the fuel cell system 100 is used in order to reduce the amount of liquid water remaining in the gas-liquid separator 32. The end scavenging process will be described in detail later.

Figure 2:
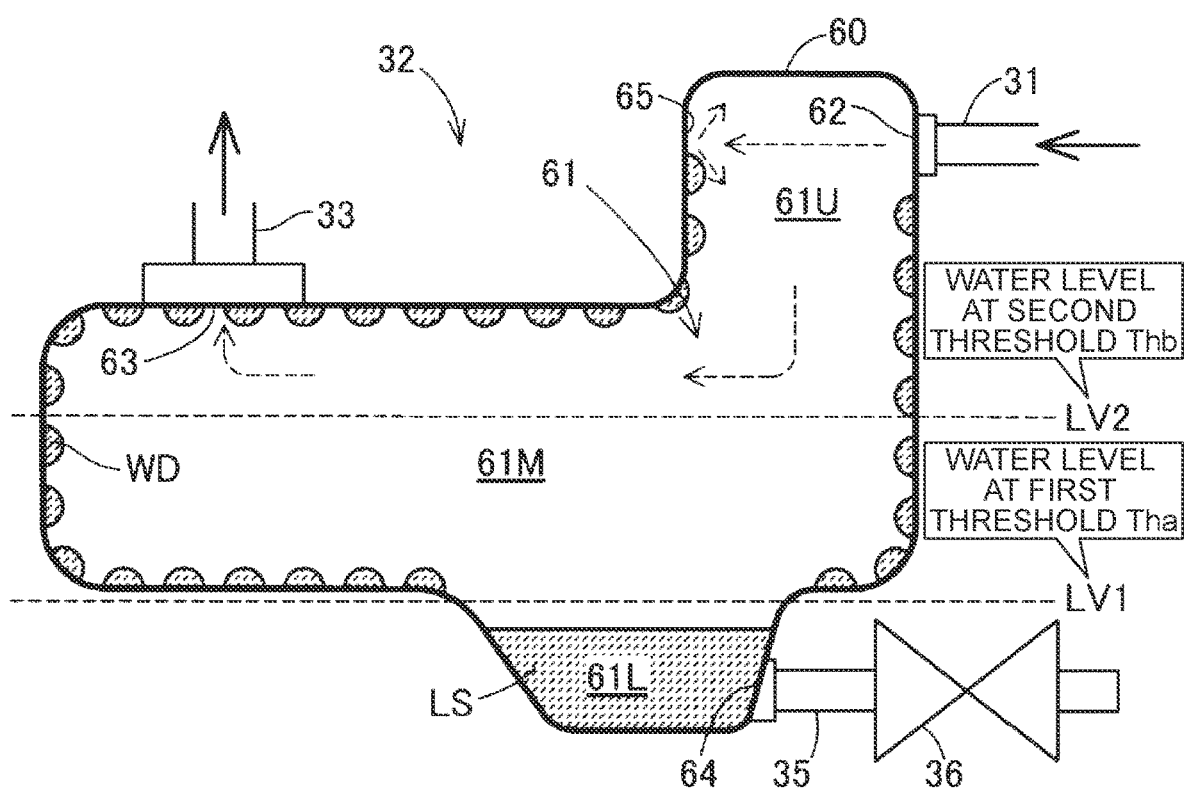
FIG. 2 is a schematic sectional view illustrating a configuration of a gas-liquid separator.

FIG. 2 is a schematic sectional view illustrating an example of the configuration of the gas-liquid separator 32. A body of the gas-liquid separator 32 is formed by a container 60 having an internal space 61 into which exhaust gas can be introduced. The gas-liquid separator 32 has an exhaust gas inlet 62 connected to the exhaust gas pipe 31, a circulation gas outlet 63 connected to the circulation pipe 33, and a drain outlet 64 connected to the drain pipe 35.

The gas-liquid separator 32 is normally disposed in the fuel cell system 100 such that the exhaust gas inlet 62 and the circulation gas outlet 63 are located in an upper region of the internal space 61 in the direction of gravity and the drain outlet 64 is located in a lower region of the internal space 61 in the direction of the gravity. In the following description of the gas-liquid separator 32, the terms "upper," "lower," "horizontal direction", and "height direction" refer to the directions based on the direction of gravity in the case where the gas-liquid separator 32 is disposed in this attitude.

The internal space 61 of the gas-liquid separator 32 includes a main region 61M, an upper region 61U, and a lower region 61L. The main region 61M is a region widest in the horizontal direction and has the largest spatial volume. The upper region 61U is a region locally projecting upward in the direction of gravity from the main region 61M. The lower region 61L is a region locally projecting downward in the direction of gravity from the main region 61M. The exhaust gas inlet 62 opens in the upper region 61U, the circulation gas outlet 63 opens in the upper end of the main region 61M, and the drain outlet 64 opens in the lower region 61L. The exhaust gas inlet 62 and the circulation gas outlet 63 are formed approximately on the opposite sides of the internal space 61 in the horizontal direction. A structure such as a blade for facilitating gas-liquid separation may be provided in the gas-liquid separator 32.

The gas-liquid separator 32 has an opposing inner wall surface 65 opposing the exhaust gas inlet 62 in the internal space 61. The opposing inner wall surface 65 forms a part of an inner wall surface that defines the upper region 61U of the internal space 61. Exhaust gas guided into the gas-liquid separator 32 through the exhaust gas inlet 62 by the exhaust gas pipe 31 flows toward the opposing inner wall surface 65 and hits the opposing inner wall surface 65 as shown by a dashed arrow. As the exhaust gas hits the opposing inner wall surface 65, the gas component of the exhaust gas diffuses, flows from the upper region 61U into the main region 61M having lower flow path resistance, and flows into the circulation pipe 33 through the circulation gas outlet 63. A large part of the liquid component contained in the exhaust gas hits the opposing inner wall surface 65 and forms droplets WD of liquid water on the opposing inner wall surface 65. The liquid component contained in the exhaust gas also forms water droplets WD on the inner wall surfaces of the internal space 61 other than the opposing inner wall surface 65. These water droplets WD are formed from splashes of liquid water produced when the liquid component contained in the exhaust gas hits the opposing inner wall surface 65 and from liquid water condensed when the liquid component contained in the exhaust gas comes into contact with the inner wall surface of the gas-liquid separator 32. As the water droplets WD on the opposing inner wall surface 65 and the inner wall surfaces of the internal space 61 other than the opposing inner wall surface 65 gather together, the water droplets WD become large enough to be guided into the lower region of the internal space 61 including the lower region 61L by gravity and stored therein. However, there are still many water droplets WD remaining on the inner wall surfaces.

In order to restrain liquid water LS stored in the internal space 61 from remaining after the drain valve 36 is opened, the gas-liquid separator 32 is configured so that liquid water LS tends to be collected into the lower region 61L at the lower end of the internal space 61. The lower region 61L is narrower in the horizontal direction than the main region 61M. Accordingly, the surface of the liquid water LS stored in the lower region 61L is less likely to fluctuate when the gas-liquid separator 32 is tilted or vibrated. The liquid water LS stored in the lower region 61L is therefore less likely to splash into the circulation pipe 33 through the circulation gas outlet 63.

Figure 3:
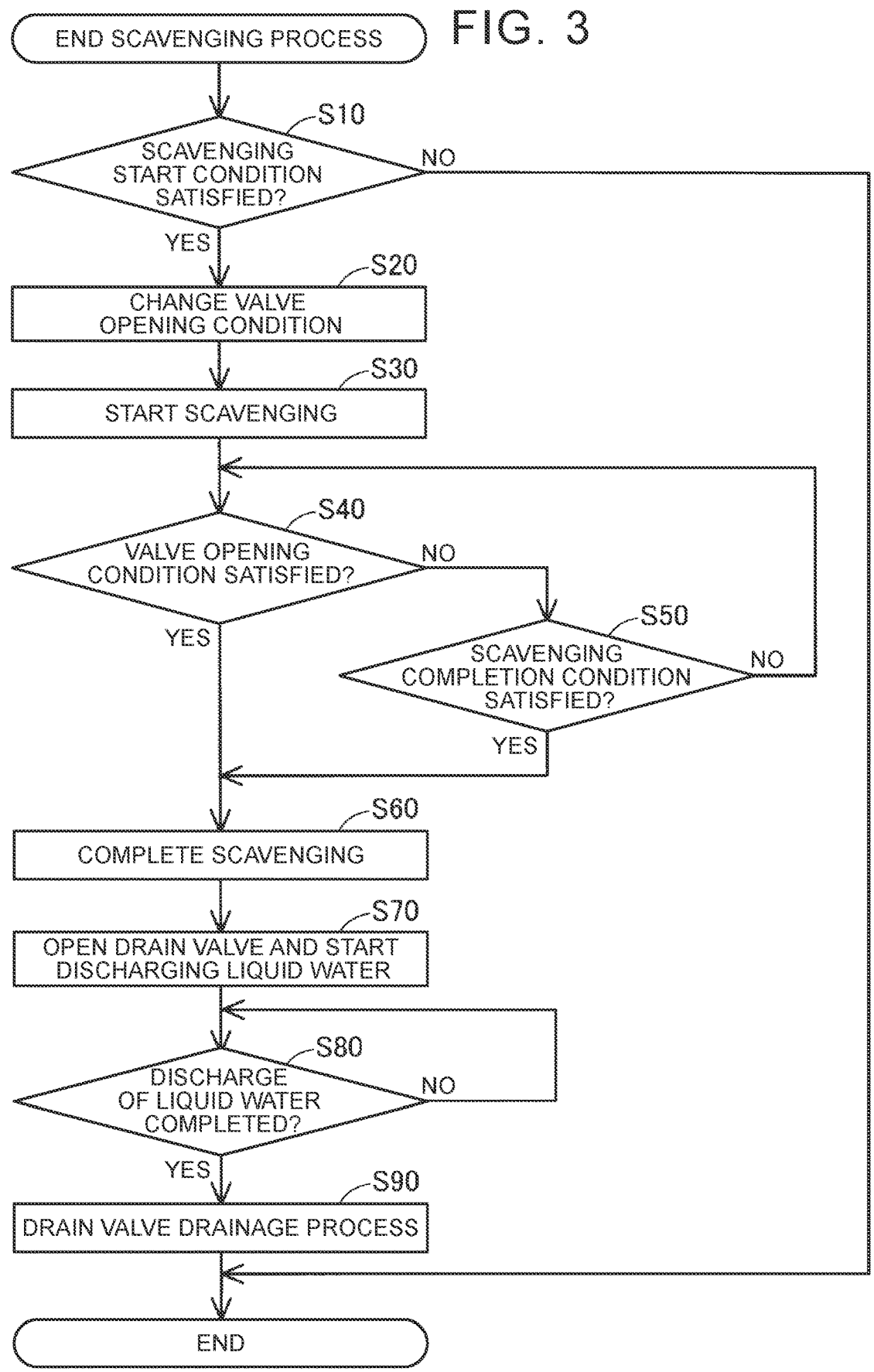
FIG. 3 is a flowchart of an end scavenging process of a first embodiment.

FIG. 3 is a flowchart of the end scavenging process in the first embodiment. The control unit 50 starts the end scavenging process in response to a command from the user to finish the operation of the fuel cell system 100. The control unit 50 also starts the end scavenging process at a predetermined timing for finishing the operation of the fuel cell system 100.

In step S10, the control unit 50 determines whether a condition for starting scavenging is satisfied or not. In the first embodiment, the condition for starting scavenging is satisfied when the outside air temperature measured by a temperature obtaining unit such as a temperature sensor, not shown, is lower than a predetermined threshold temperature. The threshold temperature is, e.g., 10° C. or less. When the outside air temperature is lower than the threshold temperature, the control unit 50 executes the processes of step S20 and the subsequent steps in order to perform scavenging. This is in order to reduce difficulty in starting the fuel cell system 100 next time which is caused when moisture remaining in the gas flow path in the fuel cell system 100 freezes in a low temperature environment in which the outside air temperature is lower than the threshold temperature. When the outside air temperature is higher than the threshold temperature, the control unit 50 terminates the end scavenging process without performing scavenging. Accordingly, when moisture remaining in the gas flow path in the fuel cell system 100 is less likely to freeze, scavenging is not performed, so that the operation of the fuel cell system 100 can be finished in a shorter time.

The condition for starting scavenging in step S10 is not limited to the above condition based on the outside air temperature. For example, the condition for starting scavenging in step S10 may be satisfied when the water content of the fuel cell stack 10 becomes higher than a predetermined threshold. The condition for starting scavenging in step S10 may be satisfied when scavenging is scheduled in advance by the user. Alternatively, the condition for starting scavenging in step S10 may be satisfied when it is determined based on calendar information that it is winter.

In step S20, the control unit 50 changes the valve opening condition for the drain valve control from the valve opening condition used during the normal operation of the fuel cell system 100. As described above, the drain valve control is executed in the end scavenging process. Steps S40 and S70 described below correspond to the process of the drain valve control. As described above, in the drain valve control of the first embodiment, the control unit 50 opens the drain valve 36 when the amount of liquid water stored in the gas-liquid separator 32 is larger than the predetermined threshold. In step S20, the valve opening condition is changed so that the amount of liquid water stored in the gas-liquid separator 32 at the time the drain valve 36 is opened is larger in the drain valve control that is performed in the end scavenging process than the amount of liquid water stored in the gas-liquid separator 32 at the time the drain valve 36 is opened in the drain valve control that is performed during the normal operation of the fuel cell system 100. More specifically, in step S20, the threshold for the valve opening condition is changed from a first threshold Tha to a second threshold Thb that is larger than the first threshold Tha. The first threshold Tha and the second threshold Thb are values representing the amount of liquid water LS stored in the gas-liquid separator 32. The first threshold Tha is a threshold that is set in advance as the valve opening condition for the drain valve control to be performed during the normal operation of the fuel cell system 100.

FIG. 2 shows a first water level LV1 as an example of the water level at the time the amount of liquid water LS corresponding to the first threshold Tha is stored in the gas-liquid separator 32, and shows a second water level LV2 as an example of the water level at the time the amount of liquid water LS corresponding to the second threshold Thb is stored in the gas-liquid separator 32.

In the drain valve control that is performed during the normal operation of the fuel cell system 100, the control unit 50 opens the drain valve 36 when the amount of liquid water stored in the gas-liquid separator 32 becomes larger than the first threshold Tha. For example, the first threshold Tha is set to a value corresponding such an amount of liquid water that the surface of the liquid water LS is located at, or closer to, the upper end of the lower region 61L when the gas-liquid separator 32 is in a predetermined reference attitude, namely when the gas-liquid separator 32 is disposed in a non-tilted state. The expression "located closer to the upper end of the lower region 61L" means that the surface of the liquid water LS is located closer to the upper end of the lower region 61L than to the lower end thereof in the height direction. The first threshold Tha may be set to a value corresponding to the amount of liquid water corresponding to 5 to 20% of the capacity of the gas-liquid separator 32. In FIG. 2, the water level at the time the amount of liquid water LS corresponding to the first threshold Tha is stored in the gas-liquid separator 32 is shown as the first water level LV1. Since the first threshold Tha is set to such a small value, the drain valve 36 is opened to discharge the liquid water LS from the gas-liquid separator 32 before the level of the liquid water LS in the gas-liquid separator 32 becomes too high during the normal operation of the fuel cell system 100. Accordingly, even when the angle of the gas-liquid separator 32 varies during the normal operation of the fuel cell system 100, the liquid water LS stored in the gas-liquid separator 32 is less likely to enter the circulation pipe 33 through the circulation gas outlet 63.

In the end scavenging process, the second threshold Thb is used instead of the first threshold Tha. For example, the second threshold Thb is set to a value corresponding such an amount of liquid water that the surface of the liquid water LS is located in, or closer to, the middle of the main region 61M in the height direction when the gas-liquid separator 32 is in the reference attitude, namely when the gas-liquid separator 32 is disposed in a non-tilted state. The expression "located closer to the middle of the main region 61M in the height direction" means that the surface of the liquid water LS is located closer to the middle of the main region 61M in the height direction than to the upper and lower ends of thereof in the height direction. The second threshold Thb may be set to a value corresponding to the amount of liquid water corresponding to 30 to 70% of the capacity of the gas-liquid separator 32. It is desirable to set the second threshold Thb so that the amount of liquid water stored in the gas-liquid separator 32 is small enough that the liquid water LS will not enter the circulation gas outlet 63 due to the suction force of the pump 34.

The reason why the valve opening condition is changed from the first threshold Tha to the second threshold Thb in step S20 will be described later. In the drain valve control of the first embodiment, as described above, the valve opening timing for the gas-liquid separator 32 is determined by the valve opening condition that uses the threshold representing the amount of liquid water stored in the gas-liquid separator 32 such as the first threshold Tha and the second threshold Thb. The liquid water LS is thus discharged from the gas-liquid separator 32 at an appropriate timing the amount of liquid water stored in the gas-liquid separator 32 reaches the amount large enough to be discharged.

Referring to FIG. 3, in step S30, the control unit 50 starts scavenging. The control unit 50 stops the supply device 25 and drives the pump 34 at a predetermined rotational speed. In step S40, the control unit 50 determines whether the valve opening condition for the drain valve 36 is satisfied or not.

When the amount of liquid water stored in the gas-liquid separator 32 is smaller than the second threshold Thb, the control unit 50 determines that the valve opening condition is not satisfied and determines in step S50 whether a condition for completing the scavenging is satisfied or not. In the first embodiment, the condition for completing the scavenging is satisfied when the scavenging is continued for a predetermined threshold time. When the condition for completing the scavenging is not satisfied, the control unit 50 continues the scavenging and repeatedly makes the determinations in steps S40 and S50. The gas flow path on the anode side thus continues to be scavenged until the valve opening condition for the drain valve 36 is satisfied or until the condition for completing the scavenging is satisfied.

When the valve opening condition for the drain valve 36 is satisfied in step S40, that is, when the amount of liquid water LS larger than the amount corresponding to the second threshold Thb is stored in the gas-liquid separator 32, the control unit 50 completes the scavenging in step S60. This is because it is considered that a sufficient amount of liquid water has been discharged from the gas flow path on the anode side of the fuel cell system 100.

When the condition for completing the scavenging is satisfied in step S50, that is, when the scavenging is continued for the predetermined threshold time, the control unit 50 completes the scavenging in step S60. This is because it is considered that a sufficient amount of moisture has been removed from the flow path for the fuel gas by the scavenging. The condition for completing the scavenging in step S50 is not limited to the condition based on the duration of the scavenging. In another embodiment, for example, the control unit 50 may determine in step S50 that the condition for completing the scavenging is satisfied when the water content of the fuel cell stack 10 or the wetness of the scavenging gas discharged from the fuel cell stack 10 becomes lower than a predetermined threshold, and may complete the scavenging in step S60.

In step S70, the control unit 50 opens the drain valve 36 to start discharging the liquid water from the gas-liquid separator 32. In step S70, the control unit 50 may drive the supply device 25 to increase the pressure in the gas-liquid separator 32 in order to facilitate discharge of the liquid water from the gas-liquid separator 32. In step S80, the control unit 50 determines whether discharge of the liquid water from the gas-liquid separator 32 is completed or not. For example, the control unit 50 calculates the rate at which the liquid water is discharged from the gas-liquid separator 32 using the pressure in the gas-liquid separator 32, and determines that discharge of the liquid water from the gas-liquid separator 32 is completed when an estimated amount of liquid water discharged from the gas-liquid separator 32, which is calculated using this rate, becomes equal to or larger than the amount of liquid water stored in the gas-liquid separator 32 before the drain valve 36 is opened. Alternatively, the control unit 50 may determine that discharge of the liquid water from the gas-liquid separator 32 is completed when a predetermined time passes after the drain valve 36 is opened. The control unit 50 keeps the drain valve 36 open until it determines in step S80 that discharge of the liquid water from the gas-liquid separator 32 is completed.

When the control unit 50 determines in step S80 that discharge of the liquid water from the gas-liquid separator 32 is completed, the control unit 50 executes a drain valve drainage process in step S90. The drain valve drainage process is a process of discharging moisture on the drain valve 36 through the drain pipe 35. In the drain valve drainage process, the control unit 50 repeats the operation of opening and closing the drain valve 36 a predetermined number of times. When the operation of opening and closing the drain valve 36 is repeated, the differential pressure between the pressure in the gas-liquid separator 32 and the outside air pressure serves as a driving force to discharge moisture on the drain valve 36. Since the drain valve drainage process is performed, moisture is less likely to remain on the drain valve 36. Accordingly, sticking of the drain valve 36 due to freezing of moisture in a low temperature environment is less likely to occur.

The end scavenging process is thus terminated. The control unit 50 then executes various preparation processes for finishing the operation of the fuel cell system 100 and finishes the operation of the fuel cell system 100. The control unit 50 performs a process of changing the valve opening condition for the drain valve control from the valve opening condition for the end scavenging process back to its original valve opening condition when the operation of the fuel cell system 100 is finished or the fuel cell system 100 is restarted.

According to the fuel cell system 100 of the first embodiment, in the drain valve control that is performed in the end scavenging process, the control unit 50 uses the valve opening condition determined so that the amount of liquid water stored in the gas-liquid separator 32 at the time the drain valve 36 is opened is larger than in the drain valve control that is performed during the normal operation of the fuel cell system 100. As shown in FIG. 2, the level of the liquid water LS stored in the gas-liquid separator 32 is thus made higher during the end scavenging process than during the normal operation of the fuel cell system 100. When the liquid water LS is discharged from the gas-liquid separator 32, moisture is less likely to remain on the inner wall surface that was in contact with the stored liquid water LS. This is because, due to the viscous force of water, the moisture on the inner wall surface of the gas-liquid separator 32 follows the overall flow of the liquid water LS which is produced when the stored liquid water LS is discharged. Accordingly, in the end scavenging process, the area of the region where the water droplets WD formed on the inner wall surface of the gas-liquid separator 32 by gas-liquid separation in the gas-liquid separator 32 remain thereon is reduced. This configuration thus reduces the amount of water droplets remaining in the gas-liquid separator 32 when the operation of the fuel cell system 100 is finished. Reduction in space in the gas-liquid separator 32 in which the liquid water LS can be stored, which is caused by freezing of such water droplets in a low temperature environment, is therefore less likely to occur. Accordingly, reduction in accuracy in estimating the amount of liquid water LS stored in the gas-liquid separator 32, which is caused by such reduction in space in the gas-liquid separator 32 in which the liquid water LS can be stored, is less likely to occur, thereby reducing difficulty in knowing the amount of liquid water LS stored in the gas-liquid separator 32. Moreover, when the fuel cell system 100 is restarted, blockage of the circulation path for circulating the gas component of the exhaust gas, which is caused by freezing of water droplets remaining in the gas-liquid separator 32, is less likely to occur, and sticking of the drain valve 36, which is caused by such water droplets moving to the drain valve 36 and frozen therein, is less likely to occur.

2. Second Embodiment

Figure 4:
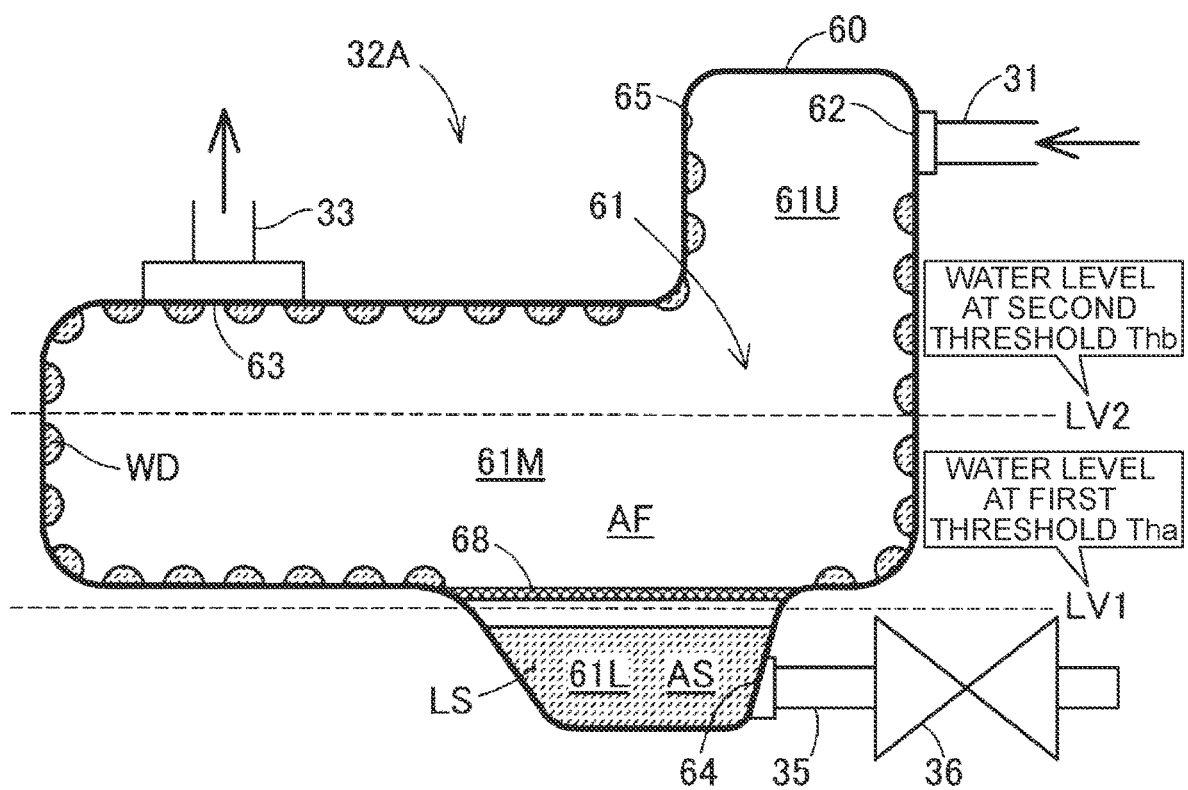
FIG. 4 is a schematic diagram illustrating a configuration of a gas-liquid separator of a second embodiment.

FIG. 4 is a schematic diagram illustrating an internal configuration of a gas-liquid separator 32A used in a fuel cell system of a second embodiment. The configuration of the fuel cell system of the second embodiment is substantially the same as that of the fuel cell system 100 of the first embodiment except that the fuel cell system of the second embodiment includes a gas-liquid separator 32A instead of the gas-liquid separator 32 described in the first embodiment.

The gas-liquid separator 32A of the second embodiment includes a filter 68 having pores through which the liquid water LS passes. The filter 68 captures foreign matter contained in the liquid water LS and moving together with the liquid water LS toward the drain outlet 64. Since the filter 68 is present, the foreign matter is less likely to reach the drain valve 36, and therefore a failure of the drain valve 36 being stuck open by the foreign matter is less likely to occur.

The filter 68 is disposed so as to divide the internal space 61 of the gas-liquid separator 32A into a first region AF on the upstream side of the filter 68 and a second region AS on the downstream side of the filter 68. As used herein, the terms "upstream" and "downstream" are based on the direction in which the liquid water LS flows toward the drain outlet 64 in the internal space 61. In the second embodiment, the filter 68 is disposed at the boundary between the main region 61M and the lower region 61L so as to close the opening at the upper end of the lower region 61L, and the filter 68 divides the internal space 61 into the first region AF and the second region AS. The first region AF is composed of the upper region 61U and the main region 61M, and the second region AS is composed of the lower region 61L. The position of the filter 68 is not limited to this. In another embodiment, the filter 68 may be disposed in the main region 61M.

In the fuel cell system of the second embodiment, the control unit 50 executes the end scavenging process according to the flow of FIG. 3 in a manner similar to that described in the first embodiment. In the second embodiment, however, the control unit 50 sets the valve opening condition for the drain valve 36 for the drain valve control that is performed during the normal operation of the fuel cell system 100 and the valve opening condition for the drain valve 36 for the drain valve control that is performed in the end scavenging process as follows. In the second embodiment, the control unit 50 uses, as the valve opening condition, the first threshold Tha and the second threshold Thb which represent the amount of liquid water stored in the gas-liquid separator 32A as in the first embodiment.

The control unit 50 uses a first valve opening condition as the valve opening condition that is used in the normal operation of the fuel cell system 100. The first valve opening condition is determined so that the drain valve 36 is opened when the level of the liquid water LS in the gas-liquid separator 32A is in the second region AS. The control unit 50 sets the first threshold Tha, which is the first valve opening condition, to a value corresponding to such an amount of liquid water LS that the surface of the liquid water LS is located in the second region AS when the gas-liquid separator 32A is in the reference attitude, namely when the gas-liquid separator 32A is disposed in a non-tilted state. That is, the control unit 50 sets the first threshold Tha to a value equal to or smaller than the amount of liquid water LS corresponding to the capacity of the second region AS. The level of the liquid water LS stored in the gas-liquid separator 32A is therefore less likely to become higher than the position of the filter 68 during the normal operation of the fuel cell system 100.

The control unit 50 uses a second valve opening condition as the valve opening condition that is used in the end scavenging process. The second valve opening condition is determined so that the drain valve 36 is opened when the level of the liquid water LS in the gas-liquid separator 32A is in the first region AF. The control unit 50 sets the second threshold Thb, which is the second valve opening condition, to a value corresponding to such an amount of liquid water LS that the surface of the liquid water LS is located in the first region AF when the gas-liquid separator 32A is in the reference attitude, namely when the gas-liquid separator 32A is disposed in a non-tilted state. That is, the control unit 50 sets the second threshold Thb to a value larger than the amount of liquid water LS corresponding to the capacity of the second region AS. Accordingly, in the end scavenging process, the drain valve 36 is opened when the level of the liquid water LS stored in the gas-liquid separator 32A is higher than the position of the filter 68.

As described above, in the end scavenging process according to the fuel cell system of the second embodiment, the drain valve 36 is opened and the liquid water LS is discharged from the gas-liquid separator 32A when the level of the liquid water LS stored in the gas-liquid separator 32A is higher than the filter 68. Moisture is therefore less likely to remain on the filter 68, and clogging of the filter 68, which is caused by freezing of moisture remaining on the filter 68 while the operation of the fuel cell system 100 is stopped, is less likely to occur. During the normal operation of the fuel cell system 100, the drain valve 36 is opened and the liquid water LS is discharged from the gas-liquid separator 32A when the level of the liquid water LS stored in the gas-liquid separator 32A is below the filter 68. Accordingly, even when the attitude of the gas-liquid separator 32A varies during the normal operation of the fuel cell system 100 and the surface of the liquid water LS fluctuates, the liquid water LS is pressed by the filter 68. The liquid water LS is therefore less likely to enter the circulation pipe 33 through the circulation gas outlet 63. Moreover, the fuel cell system of the second embodiment has various functions and effects similar to those described in the first embodiment.

3. Third Embodiment

Figure 5:
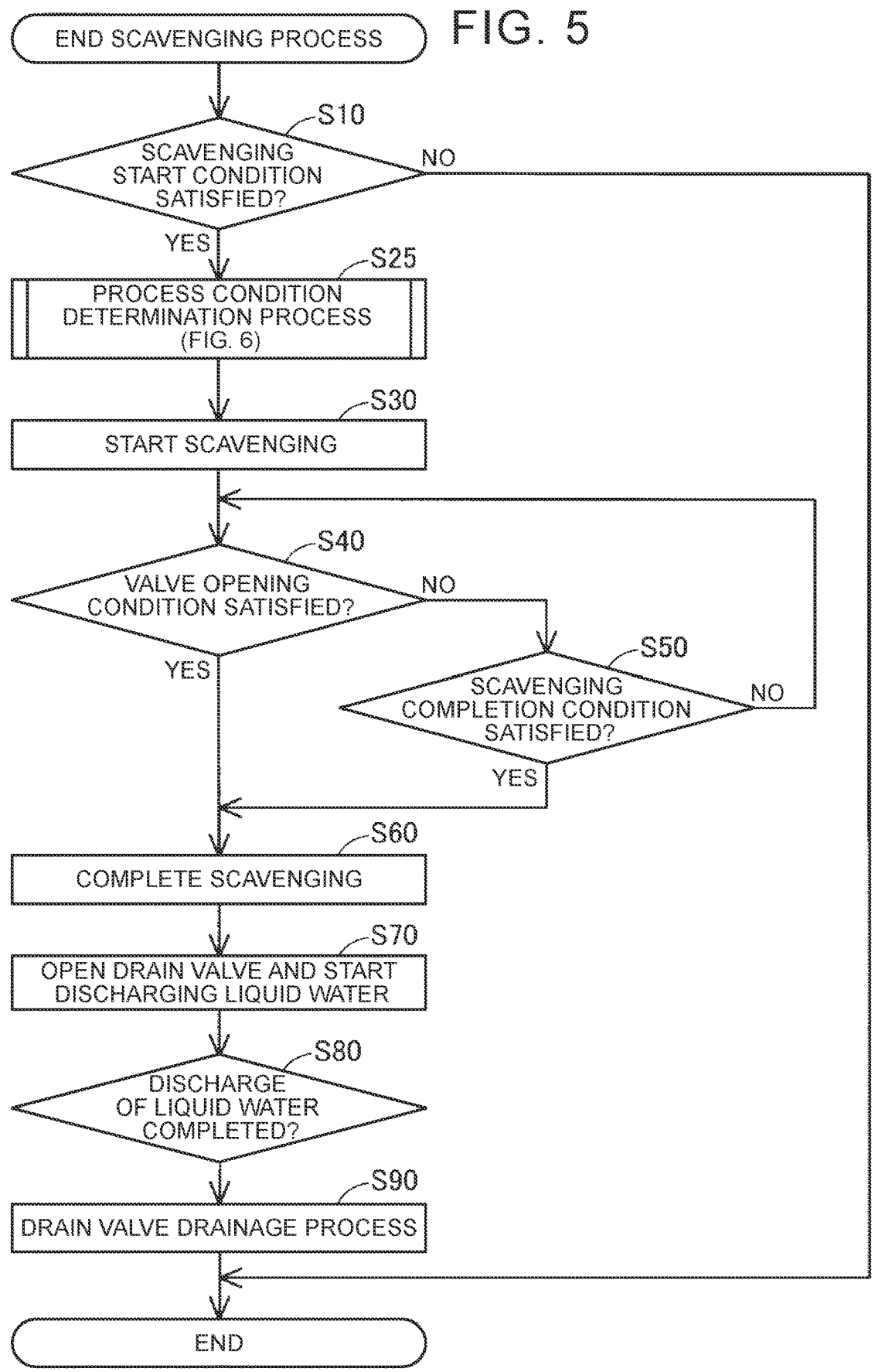
FIG. 5 is a flowchart of an end scavenging process of a third embodiment.

FIG. 5 is a flowchart of an end scavenging process that is executed in a fuel cell system of a third embodiment. The configuration of the fuel cell system of the third embodiment is substantially the same as that of the fuel cell system 100 of the first embodiment shown in FIG. 1. The end scavenging process of the third embodiment is substantially the same as that described in the first embodiment except that the end scavenging process of the third embodiment includes step S25 instead of step S20. In step S25, the control unit 50 executes a process condition determination process described below.

Figure 6:
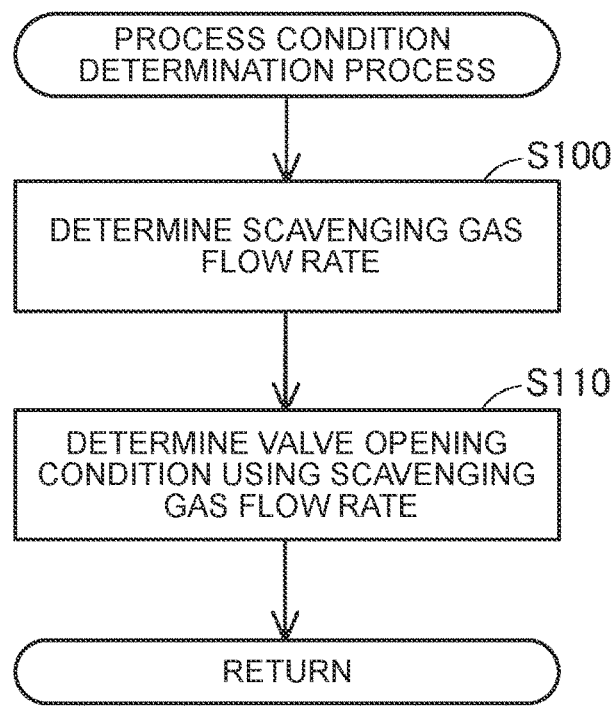
FIG. 6 is a flowchart of a process condition determination process of the third embodiment.

FIG. 6 is a flowchart of the process condition determination process. In the process condition determination process, a condition for performing the scavenging and a valve opening condition for the drain valve control are determined.

In step S100, the control unit 50 determines, as the condition for performing the scavenging, the flow rate of scavenging gas for performing the scavenging is determined. In the third embodiment, the control unit 50 determines the flow rate of the scavenging gas based on the tilt angle of the gas-liquid separator 32. The control unit 50 reduces the flow rate of the scavenging gas as the angle by which the gas-liquid separator 32 is tilted from the predetermined reference attitude in such a rotation direction that the exhaust gas inlet 62 side of the gas-liquid separator 32 is moved upward and the circulation gas outlet 63 side of the gas-liquid separator 32 is moved downward increases. This is because, when the gas-liquid separator 32 is tilted in such a direction, the surface of the liquid water LS stored in the gas-liquid separator 32 approaches the circulation gas outlet 63 and the liquid water LS more easily enters the circulation gas outlet 63 due to the suction force of the pump 34.

The control unit 50 obtains the tilt angle of the gas-liquid separator 32 using, e.g., an acceleration sensor, not shown. The control unit 50 also obtains the flow rate of the scavenging gas for the tilt angle of the gas-liquid separator 32 using a map or equation prepared in advance which defines the relationship between the tilt angle of the gas-liquid separator 32 and the flow rate of the scavenging gas. The control unit 50 may increase the duration of the scavenging, which is the condition for completing the scavenging, as the flow rate of the scavenging gas decreases.

In step S110, the control unit 50 determines the valve opening condition for the drain valve 36 in the drain valve control by using the flow rate of the scavenging gas determined in step S100. The control unit 50 obtains the valve opening condition for the flow rate of the scavenging gas using a map prepared in advance. In the third embodiment, the control unit 50 uses as the valve opening condition the first threshold Tha and the second threshold Thb which represent the amount of liquid water stored in the gas-liquid separator 32 as described in the first embodiment.

Figure 7:
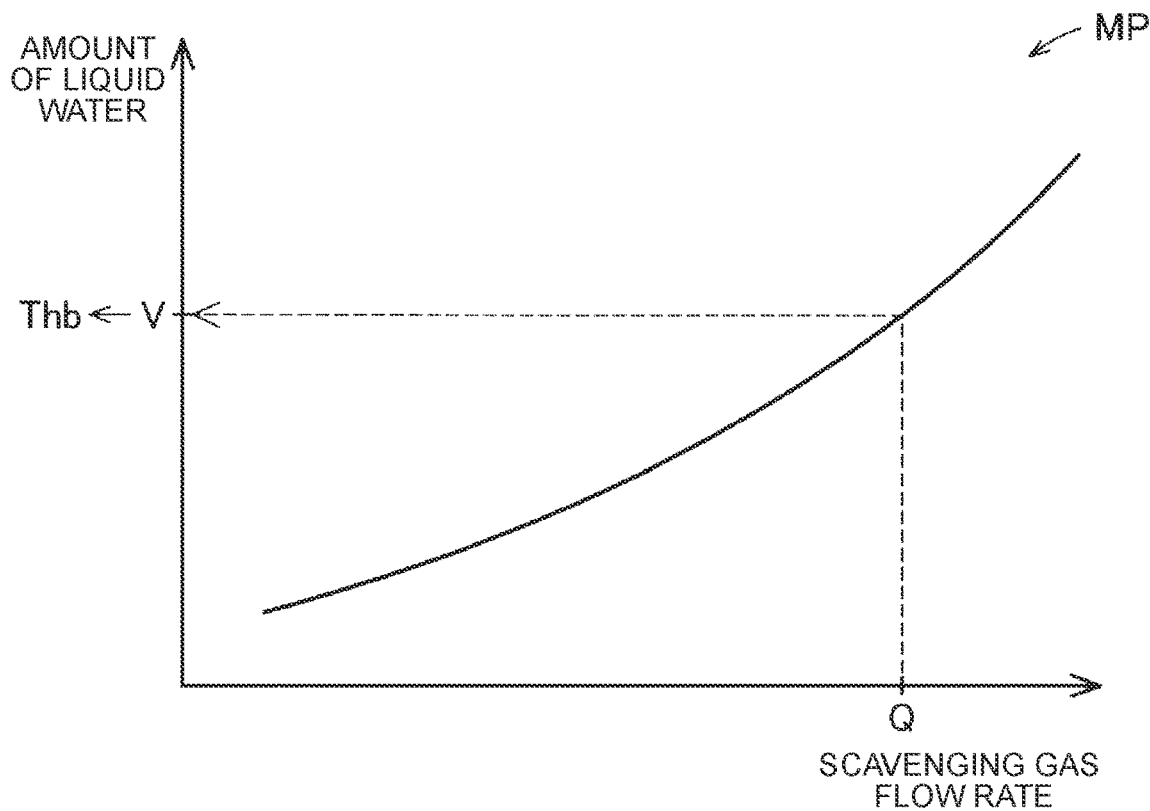
FIG. 7 illustrates an example of a map that is used to determine a valve opening condition in the third embodiment.

FIG. 7 illustrates an example of a map MP that is used to determine the valve opening condition in step S110. The map MP defines the relationship between the flow rate of the scavenging gas and the amount of liquid water. Specifically, according to the map MP, the lower the flow rate of the scavenging gas is, the smaller the amount of liquid water is. By using the map MP, the control unit 50 obtains the amount V of liquid water for the flow rate Q of the scavenging gas determined in step S110. The control unit 50 sets the second threshold Thb to the obtained amount V of liquid water. The map MP is set so that the amount V of liquid water obtained for the flow rate Q of the scavenging gas is larger than the first threshold Tha that is used during the normal operation of the fuel cell system 100.

Referring to FIG. 5, in step S30, the control unit 50 starts the scavenging using the flow rate of the scavenging gas determined in the process condition determination process as a target flow rate. The control unit 50 drives the pump 34 at a rotational speed according to the target flow rate. In step S40, the control unit 50 determines that the valve opening condition is satisfied when the amount of liquid water LS stored in the gas-liquid separator 32 is larger than the second threshold Thb determined in the process condition determination process. The control unit 50 completes the scavenging in step S60, and then opens the drain valve 36 to start discharging the liquid water LS from the gas-liquid separator 32 in step S70.

As described above, in the third embodiment, the lower the flow rate of the scavenging gas is, the smaller the second threshold Thb is and the smaller the amount of liquid water LS stored in the gas-liquid separator 32 at the time the drain valve 36 is opened is. The flow rate of the scavenging gas is set to a smaller value when the gas-liquid separator 32 is tilted and the surface of the liquid water LS stored therein approaches the circulation gas outlet 63. Since the amount of liquid water LS stored in the gas-liquid separator 32 is reduced as the flow rate of the scavenging gas decreases, the liquid water LS is even less likely to enter the circulation gas outlet 63.

As described above, in the end scavenging process according to the fuel cell system of the third embodiment, the flow rate of the scavenging gas is set to a smaller value when the gas-liquid separator 32 is tilted so that the surface of the liquid water LS approaches the circulation gas outlet 63. The liquid water LS is therefore less likely to be stirred up by the suction force of the pump 34 during the scavenging. As the flow rate of the scavenging gas decreases, the second threshold Thb, which is the valve opening condition for the drain valve 36, is set to a smaller value, and the amount of liquid water LS stored in the gas-liquid separator 32 is reduced. The liquid water LS stored in the gas-liquid separator 32 is therefore even less likely to be stirred up by the suction force of the pump 34. Moreover, the fuel cell system of the third embodiment has various functions and effects similar to those described in the first embodiment.

4. Fourth Embodiment

Figure 8:
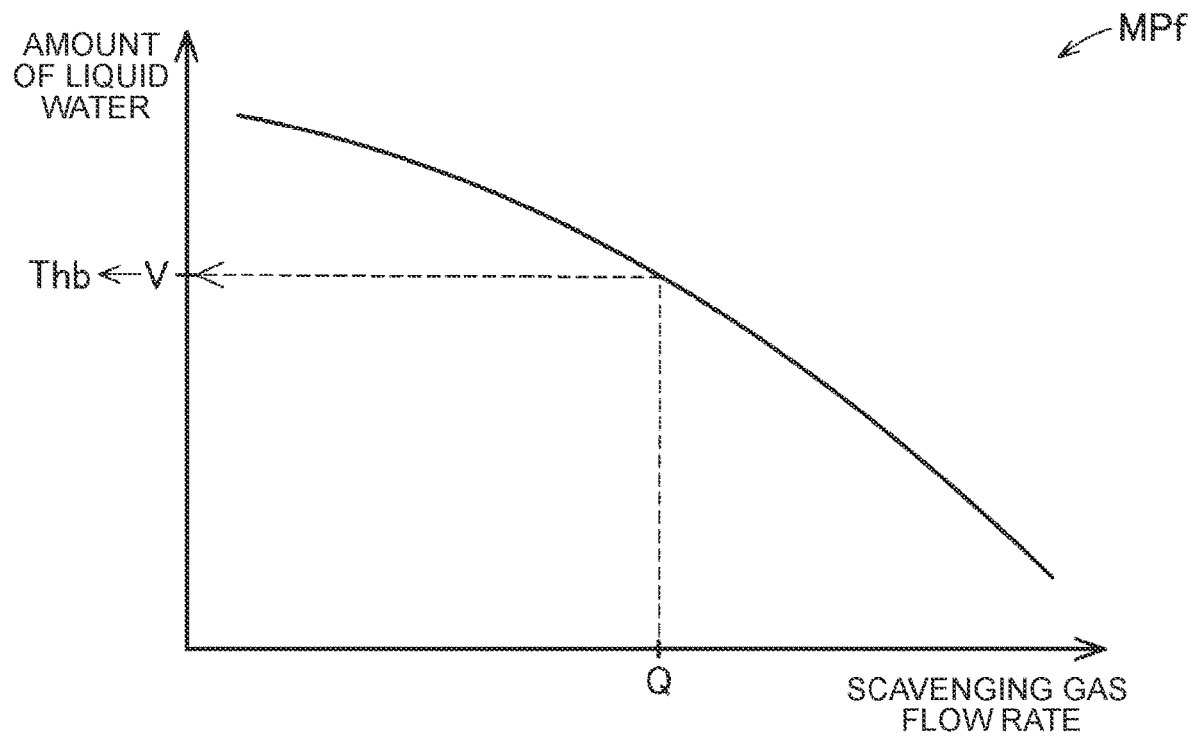
FIG. 8 illustrates an example of a map that is used to determine a valve opening condition in a fourth embodiment.

FIG. 8 illustrates an example of a map MPf that is used in a fuel cell system of a fourth embodiment. The configuration of the fuel cell system of the fourth embodiment is substantially the same as that of the fuel cell system of the third embodiment. In the fuel cell system of the fourth embodiment, the control unit 50 executes the end scavenging process and the process condition determination process according to the flows shown in FIGS. 5 and 6 as described in the third embodiment. However, the process condition determination process of the fourth embodiment is different from that of the third embodiment in the method for determining the flow rate of the scavenging gas and the method for determining the valve opening condition. The map MPf in FIG. 8 is used when determining the valve opening condition in the process condition determination process.

In step S100 of the process condition determination process of the fourth embodiment, the control unit 50 sets the flow rate of the scavenging gas to a larger value as the temperature of exhaust gas is lower. When the temperature of the exhaust gas is lower, the amount of saturated water vapor in the scavenging gas is smaller, and therefore the amount of moisture removed by the scavenging gas is smaller. Since the flow rate of the scavenging gas is increased as the temperature of the exhaust gas is lower, the amount of moisture removed by the scavenging gas is less likely to be reduced, and therefore scavenging efficiency is less likely to be reduced.

In step S110, control unit 50 obtains the amount V of liquid water for the flow rate Q of the scavenging gas determined in step S100 by using map MPf. The map MPf defines the relationship between the flow rate of the scavenging gas and the amount of liquid water. Specifically, according to the map MPf, the higher the flow rate of the scavenging gas is, the smaller the amount of liquid water is. The control unit 50 sets the second threshold Thb to the amount V of liquid water obtained from the map MPf. The map MPf is set so that the amount V of liquid water obtained for the flow rate Q of the scavenging gas is larger than the first threshold Tha that is used during the normal operation of the fuel cell system 100.

In step S30 of the end scavenging process, the control unit 50 starts the scavenging by driving the pump 34 at a rotational speed according to the flow rate of the scavenging gas determined in the process condition determination process. In step S40, the control unit 50 determines that the valve opening condition is satisfied when the amount of liquid water LS stored in the gas-liquid separator 32 is larger than the second threshold Thb determined in the process condition determination process. The control unit 50 completes the scavenging in step S60 and opens the drain valve 36 in step S70.

According to the end scavenging process of the fuel cell system of the fourth embodiment, when the flow rate of the scavenging gas is increased in order to restrain reduction in scavenging efficiency, the second threshold Thb, which is the valve opening condition for the drain valve 36, is set to a smaller value. The amount of liquid water LS stored in the gas-liquid separator 32 during the end scavenging process is thus reduced. Accordingly, even when the suction force of the pump 34 is increased as a result of increasing the flow rate of the scavenging gas, the liquid water LS in the gas-liquid separator 32 is less likely to be stirred up into the circulation pipe 33. Moreover, the fuel cell system of the fourth embodiment has various functions and effects similar to those described in the first and third embodiments.

5. Other Embodiments

For example, the various configurations described in the above embodiments can be modified as follows. Like the above embodiments, each of other embodiments described below is regarded as an example of the mode for carrying out the technique of the present disclosure.

Other Embodiment 1

In the above embodiments, the first threshold Tha and the second threshold Thb, which represent the amount of liquid water LS stored in the gas-liquid separator 32, are used as the valve opening condition in the drain valve control. However, other valve opening conditions may be used. For example, the duration of the scavenging may be used as the valve opening condition for the drain valve control. In this case, the control unit 50 may determine that the valve opening condition is satisfied and open the drain valve 36 when the scavenging is continued for longer than a predetermined threshold time after the start of the scavenging. In this case, the threshold time used in the end scavenging process is set to a value larger than a threshold time used in the drain valve control that is performed during the normal operation of the fuel cell system. Even when this condition is used, the amount of liquid water LS stored in the gas-liquid separator 32 at the time the drain valve 36 is opened during the end scavenging process is larger than during the normal operation of the fuel cell system. Various other conditions may be used as the valve opening condition for the drain valve control. In the above embodiments, the valve opening condition for the drain valve control is changed in the end scavenging process. However, the valve opening condition for the end scavenging process may be set as a default condition, and the valve opening condition may be changed from the valve opening condition for the end scavenging process to the valve opening condition for the normal operation of the fuel cell system 100 when starting the normal operation of the fuel cell system 100.

Other Embodiment 2

The gas-liquid separators 32, 32A are not limited to the configuration described in the above embodiments. For example, the lower region 61L may be omitted from the gas-liquid separators 32, 32A, or the gas-liquid separators 32, 32A may be configured so that the bottom surface is formed by an inner surface tapered downward. In the above embodiments, the process of determining whether the scavenging can be performed or not in step S10 and the drain valve drainage process in step S90 of the end scavenging process may be omitted. In the end scavenging process of the above embodiments, the scavenging and the valve opening control may be repeated after the valve opening condition is satisfied in step S40 and the liquid water is discharged from the gas-liquid separator 32, 32A in steps S70 and S80. In the above embodiments, the control unit 50 may obtain the amount of liquid water stored in the gas-liquid separator 32, 32A using a water level sensor etc. provided in the gas-liquid separator 32, 32A instead of calculating the estimated amount of liquid water stored in the gas-liquid separator 32, 32A.

Other Embodiment 3

The gas-liquid separator 32A having the filter 68 according to the second embodiment may be applied to the fuel cell system of the third embodiment or the fourth embodiment. In this case, during the normal operation of the fuel cell system, the drain valve 36 may be opened when the surface of the liquid water LS is located in the second region AS, and in the end scavenging process, the drain valve 36 may be opened when the surface of the liquid water LS is located in the first region AF.

Other Embodiment 4

In the third and fourth embodiments, the flow rate of the scavenging gas may be changed according to conditions other than the tilt angle of the gas-liquid separator 32 and the temperature of the exhaust gas. For example, the flow rate of the scavenging gas may be determined according to the gas density of the exhaust gas, the current driving efficiency of the pump 34, or the current water content of the fuel cell stack 10.

Other Embodiment 5

In the above embodiments, the configuration for circulating fuel gas to the fuel cell stack 10, which is used in the fuel gas supply system, may be applied to the oxidant gas supply system for the fuel cell stack 10. In this case, the drain valve control and the end scavenging process, which are described above, may be performed in the oxidant gas supply system for the fuel cell stack 10.

6. Others

In the above embodiments, a part or all of the functions and processes implemented by software may be implemented by hardware. A part or all of the functions and processes implemented by hardware may be realized by software. Various circuits can be used as the hardware, such as, e.g., an integrated circuit, a discrete circuit, or a circuit module comprised of a combination thereof.

The technique of the present disclosure is not limited to the above embodiments and can be implemented by various configurations without departing from the spirit and scope of the present disclosure. For example, the technical features in the embodiments, which correspond to the technical features in each form described in the section "SUMMARY," may be replaced or combined as appropriate in order to part of all of the problems described above or to provide a part or all of the effects described above. Any technical features including those which are described as not essential in the specification can be omitted as appropriate unless they are described as essential in the specification.

What is claimed is:

1. A fuel cell system, comprising:
a fuel cell stack configured to be supplied with reactant gas to generate electric power;
a gas-liquid separator connected to the fuel cell stack and configured to separate exhaust gas of the fuel cell stack into a liquid component and a gas component and to store liquid water of the liquid component;
a circulation pipe that is connected to the gas-liquid separator and that constitutes a circulation path configured to circulate the gas component in the gas-liquid separator to the fuel cell stack;
a drain pipe connected to the gas-liquid separator and configured to discharge the liquid water from the gas-liquid separator;
a drain valve configured to open and close the drain pipe; and
a control unit configured to control supply of the reactant gas to the fuel cell stack and to execute an end scavenging process, the end scavenging process being a process of circulating as scavenging gas the gas component of the exhaust gas to perform scavenging when operation of the fuel cell system is finished, wherein
the control unit is configured to perform drain valve control, the drain valve control being control in which, when a valve opening condition determined in advance in association with a first amount of the liquid water stored in the gas-liquid separator is satisfied, the drain valve is opened to discharge the liquid water from the gas-liquid separator, and
the control unit is configured such that, in the end scavenging process, the control unit performs the drain valve control using the valve opening condition that is set such that a second amount of the liquid water stored in the gas-liquid separator at a time the drain valve is opened in the end scavenging process is larger than the first amount of the liquid water stored in the gas-liquid separator at a time the drain valve is opened during normal operation of the fuel cell system.

2. The fuel cell system according to claim 1, wherein
the control unit is configured to obtain the amount of the liquid water stored in the gas-liquid separator,
the control unit is configured such that, in the drain valve control that is performed during the normal operation of the fuel cell system, the control unit determines that the valve opening condition is satisfied and opens the drain valve when the amount of the liquid water stored in the gas-liquid separator becomes larger than a predetermined first threshold, and
the control unit is configured such that, in the drain valve control that is performed in the end scavenging process, the control unit determines that the valve opening condition is satisfied and opens the drain valve when the amount of the liquid water stored in the gas-liquid separator becomes larger than a second threshold that is set to a larger value than the first threshold.

3. The fuel cell system according to claim 1, wherein
the control unit is configured such that, in the end scavenging process, the control unit determines a flow rate of the scavenging gas and sets the valve opening condition according to the determined flow rate of the scavenging gas before starting the scavenging.

4. A fuel cell system, comprising:
a fuel cell stack configured to be supplied with reactant gas to generate electric power;
a gas-liquid separator connected to the fuel cell stack and configured to separate exhaust gas of the fuel cell stack into a liquid component and a gas component and to store liquid water of the liquid component;
a circulation pipe that is connected to the gas-liquid separator and that constitutes a circulation path configured to circulate the gas component in the gas-liquid separator to the fuel cell stack;
a drain pipe connected to the gas-liquid separator and configured to discharge the liquid water from the gas-liquid separator;
a drain valve configured to open and close the drain pipe; and
a control unit configured to control supply of the reactant gas to the fuel cell stack and to execute an end scavenging process, the end scavenging process being a process of circulating as scavenging gas the gas component of the exhaust gas to perform scavenging when operation of the fuel cell system is finished, wherein
the control unit is configured to perform drain valve control, the drain valve control being control in which, when a valve opening condition determined in advance in association with an amount of the liquid water stored in the gas-liquid separator is satisfied, the drain valve is opened to discharge the liquid water from the gas-liquid separator, and
the control unit is configured such that, in the end scavenging process, the control unit performs the drain valve control using the valve opening condition that is set such that an amount of the liquid water stored in the gas-liquid separator at a time the drain valve is opened in the end scavenging process is larger than an amount of the liquid water stored in the gas-liquid separator at a time the drain valve is opened during normal operation of the fuel cell system,
wherein
a filter configured such that the liquid water passes through the filter is provided in the gas-liquid separator,
the filter is disposed so as to divide an internal space of the gas-liquid separator into a first region above the filter and a second region below the filter,
the control unit is configured such that, during the normal operation of the fuel cell system, the control unit performs the drain valve control using a first valve opening condition as the valve opening condition, the first valve opening condition being determined such that the drain valve is opened when a level of the liquid water in the gas-liquid separator is in the second region, and
the control unit is configured such that, in the end scavenging process, the control unit performs the drain valve control using a second valve opening condition as the valve opening condition, the second valve opening condition being determined such that the drain valve is opened when the level of the liquid water in the gas-liquid separator is in the first region.

5. A method for controlling a fuel cell system, the fuel cell system including a fuel cell stack configured to be supplied with reactant gas to generate electric power, a gas-liquid separator configured to separate exhaust gas of the fuel cell stack into a liquid component and a gas component and to store liquid water of the liquid component, a circulation pipe that constitutes a circulation path configured to circulate the gas component in the gas-liquid separator to the fuel cell stack, a drain pipe configured to discharge the liquid water from the gas-liquid separator, and a drain valve configured to open and close the drain pipe, the method comprising:
executing an end scavenging process, the end scavenging process being a process of circulating as scavenging gas the gas component of the exhaust gas to perform scavenging when operation of the fuel cell system is finished; and
performing drain valve control, the drain valve control being control in which, when a valve opening condition determined in advance in association with a first amount of the liquid water stored in the gas-liquid separator is satisfied, the drain valve is opened to discharge the liquid water from the gas-liquid separator, wherein
in the end scavenging process, the drain valve control is performed using the valve opening condition that is set such that a second amount of the liquid water stored in the gas-liquid separator at a time the drain valve is opened in the end scavenging process is larger than the first amount of the liquid water stored in the gas-liquid separator at a time the drain valve is opened during normal operation of the fuel cell system.

* * * * *